United States Patent
Lin et al.

(10) Patent No.: US 8,269,749 B2
(45) Date of Patent: Sep. 18, 2012

(54) DISPLACEMENT DETECTION SYSTEM OF AN OPTICAL TOUCH PANEL AND METHOD THEREOF

(75) Inventors: Chih-Hsin Lin, Hsin-Chu (TW); Ren-Hau Gu, Hsin-Chu (TW); Tzung-Min Su, Hsin-Chu (TW); Cho-Yi Lin, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 304 days.

(21) Appl. No.: 12/826,638

(22) Filed: Jun. 29, 2010

(65) Prior Publication Data

US 2010/0328244 A1    Dec. 30, 2010

Related U.S. Application Data

(60) Provisional application No. 61/221,565, filed on Jun. 30, 2009.

(51) Int. Cl.
*G06F 3/042* (2006.01)

(52) U.S. Cl. .................. 345/175; 178/18.02; 178/18.09
(58) Field of Classification Search .................. None
See application file for complete search history.

(56) References Cited

U.S. PATENT DOCUMENTS 6,674,424 B1 * 1/2004 Fujioka .................. 345/175

* cited by examiner

*Primary Examiner* — Wayne Young
*Assistant Examiner* — Brian Butcher
(74) *Attorney, Agent, or Firm* — Winston Hsu; Scott Margo

(57) ABSTRACT

At a first time, a first image sensor and a second image sensor capture a first image and a second image including images of an object respectively. At a second time, the first image sensor and the second image sensor capture a third image and a fourth image including images of the object respectively. A coordinate calculation device calculates a first coordinate of the object at the first time according to the first image and the second image, and a second coordinate of the object at the second time according to the third image and the fourth image. A coordinate correction device calculates a displacement between the first time and the second time according to the first coordinate and the second coordinate, and corrects an output coordinate of the object at the second time according to the displacement.

12 Claims, 4 Drawing Sheets

DISPLACEMENT DETECTION SYSTEM OF AN OPTICAL TOUCH PANEL AND METHOD THEREOF

CROSS REFERENCE TO RELATED APPLICATIONS

This application claims the benefit of U.S. Provisional Application No. 61/221,565, filed on Jun. 30, 2009 and entitled "COORDINATE DETECTION OF TOUCH SYSTEM," the contents of which are incorporated herein by reference.

BACKGROUND OF THE INVENTION

1. Field of the Invention

The present invention relates to a displacement detection system of an optical touch panel and method thereof, and more particularly, to a displacement detection system of an optical touch panel and method thereof capable of correcting output coordinates according to a displacement.

2. Description of the Prior Art

A traditional optical touch panel utilizes a light source to light a panel, and an image sensor to capture an image including an image of an object. The optical touch panel utilizes luminance information of the object to calculate a center of gravity of the object, so the center of gravity of the object obtained according to the luminance information of the object may be biased to one side of the panel when the object moves across corners of the panel. In this situation, although the object moves straight forward, the image sensor may capture a curved image of the object when the object moves across corners of the panel. Please refer to FIG. 1. FIG. 1 is a diagram illustrating the image sensor capturing the uncorrected image of the object when the object moves across corners of the panel. As shown in FIG. 1, the center of gravity of the object obtained according to the luminance information of the object may be biased to one side of the panel because the object moves from a light/dark area to a light/dark area of the panel.

The prior art utilizes a center of the object to calculate shadow points for improving the above mentioned situation. But quality of interpolation calculation is poor in the prior art utilizing the center of the object, and may result in sawtooth images appearing when the object moves slowly.

SUMMARY OF THE INVENTION

An embodiment of the present invention provides a displacement detection system of an optical touch panel. The displacement detection system comprises a panel, at least one first image sensor and a second image sensor, a coordinate calculation device, and a coordinate correction device. The panel is used for being touched by an object. The first image sensor and the second image sensor are installed on different positions of the panel, and view of the first image sensor and view of the second image sensor are overlapped. The coordinate calculation device is used for utilizing the first image sensor and the second image sensor to capture a first image and a second image including images of the object respectively at a first time, utilizing image positions of the object in the first image and the second image to calculate a first coordinate of the object at the first time, utilizing the first image sensor and the second image sensor to capture a third image and a fourth image including images of the object respectively at a second time, and utilizing image positions of the object in the third image and the fourth image to calculate a second coordinate of the object at the second time. The coordinate correction device is used for calculating a displacement of the object between the first time and the second time according to the first coordinate and the second coordinate, and for correcting an output coordinate of the object at the second time according to the displacement.

Another embodiment of the present invention provides a displacement detection method of an optical touch panel. The displacement detection method comprises capturing a first image including an object by a first image sensor and a second image including the object by a second image sensor on a panel at a first time; capturing a third image including the object by the first image sensor and a fourth image including the object by the second image sensor on the panel at a second time; calculating a first coordinate of the object at the first time according to image positions of the object in the first image and the second image; calculating a second coordinate of the object at the second time according to image positions of the object in the third image and the fourth image; calculating a displacement of the object between the first time and the second time according to the first coordinate and the second coordinate; correcting an output coordinate of the object at the second time according to the displacement.

Another embodiment of the present invention provides a displacement detection system of an optical touch panel. The displacement detection system comprises a panel, at least one first image sensor and a second image sensor, a coordinate calculation device, and a coordinate correction device. The panel is used for being touched by an object. The first image sensor and the second image sensor are installed on different positions of the panel, and view of the first image sensor and view of the second image sensor are overlapped. The coordinate calculation device is used for saving an initial coordinate of the object on the panel at an initial time, utilizing the first image sensor and the second image sensor to capture a first image and a second image including images of the object respectively at a first time, and utilizing image positions of the object in the first image and the second image to calculate a first coordinate of the object at the first time. And the coordinate correction device is used for calculating a displacement of the object between the initial time and the first time according to the initial coordinate and the first coordinate, and for correcting an output coordinate of the object at the first time according to the displacement.

The present invention provides a displacement detection system of an optical touch panel and method thereof. The displacement detection system of an optical touch panel and method thereof generate an adapting smoothing parameter according to a displacement of an object between two different time points. Then, based on a relationship between a velocity of the object and an image position at the last time is reverse, the present invention utilizes the adapting smoothing parameter to give different weighted values to the image positions of the two different time points. Therefore, a moving trace of the object corrected by the weighted values may not be influenced when the object moves from the light/dark area to the light/dark area of the panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
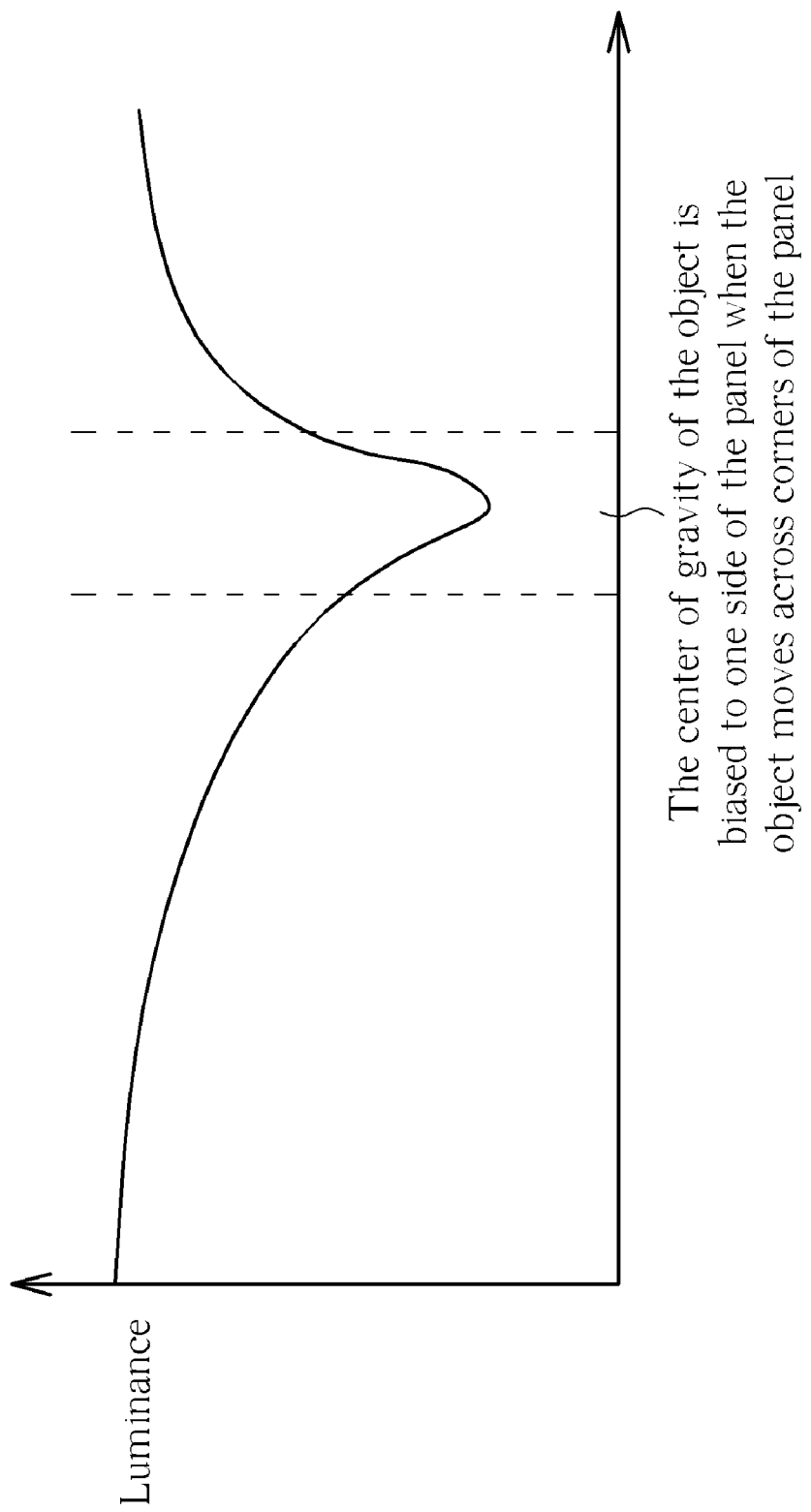
FIG. 1 is a diagram illustrating the image sensor capturing the uncorrected image of the object when the object moves across corners of the panel.
Figure 2:
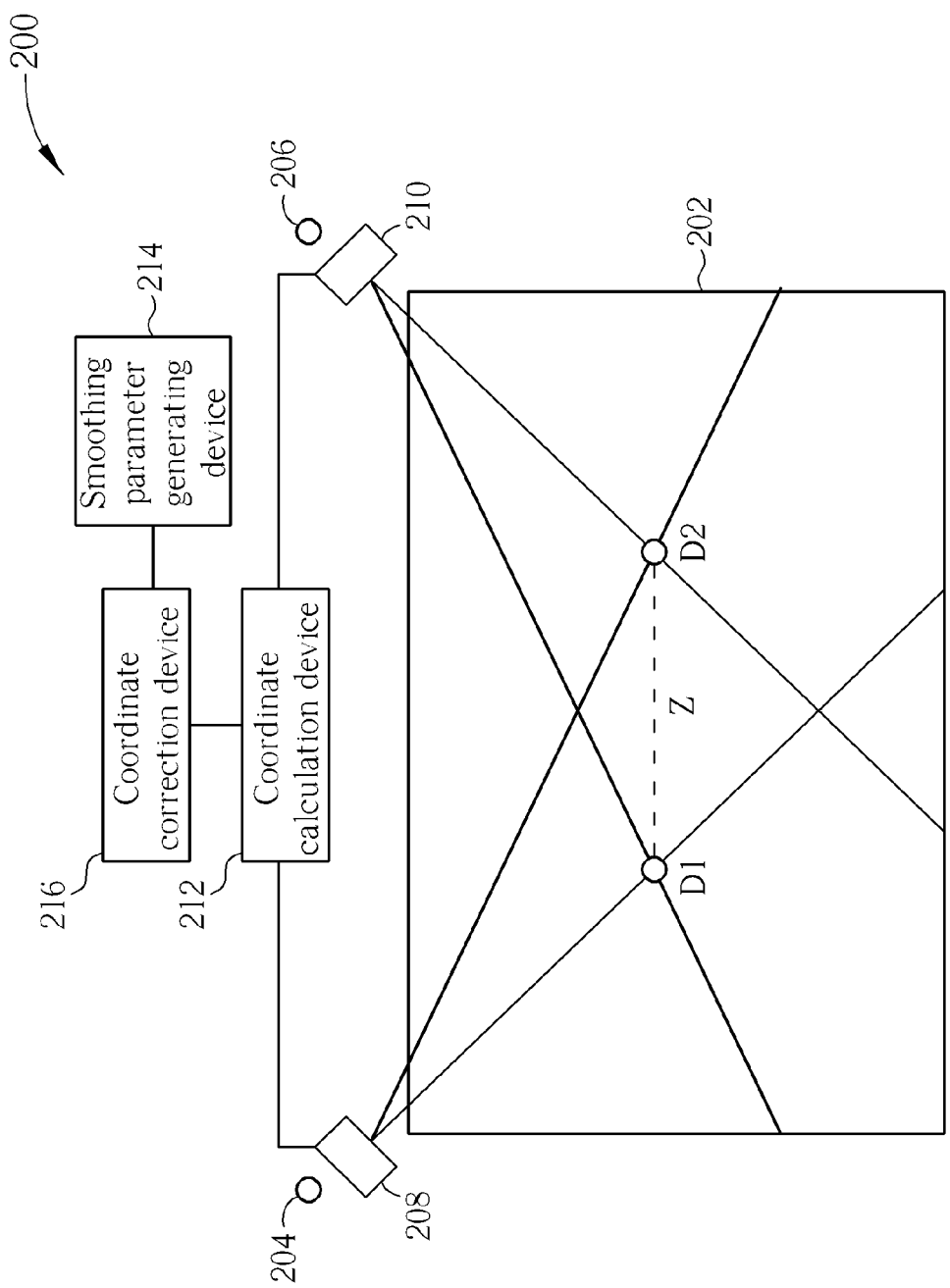
FIG. 2 is a diagram illustrating a displacement detection system of an optical touch panel according to an embodiment of the present invention.

Please refer to FIG. 2. FIG. 2 is a diagram illustrating a displacement detection system 200 of an optical touch panel according to an embodiment of the present invention. The displacement detection system 200 comprises a panel 202, a first light source 204, a second light source 206, a first image sensor 208, a second image sensor 210, a coordinate calculation device 212, a smoothing parameter generating device 214, and a coordinate correction device 216. The panel 202 is used for being touched by an object. The first light source 204 and the second light source 206 are used for lighting the panel 202. The first image sensor 208 and the second image sensor 210 are installed on different positions of the panel 202, and view of the first image sensor 208 and view of the second image sensor 210 are overlapped. At a first time, the first image sensor 208 and the second image sensor 210 capture a first image and a second image including images of the object respectively, and at a second time, the first image sensor 208 and the second image sensor 210 capture a third image and a fourth image including images of the object respectively. The coordinate calculation device 212 is coupled to the first image sensor 208 and the second image sensor 210 for using image positions of the object in the first image and the second image to calculate a first coordinate D1 of the object at the first time, and using image positions of the object in the third image and the fourth image to calculate a second coordinate D2 of the object at the second time. The coordinate correction device 216 is coupled to the coordinate calculation device 212 for calculating a displacement Z of the object between the first time and the second time according to the first coordinate D1 and the second coordinate D2.

The smoothing parameter generating device 214 is coupled to the coordinate correction device 216 for substituting the displacement Z into equation (1) to generate an adaptive smoothing parameter $\lambda$:

$$\lambda = k \frac{1}{\sqrt{(y_i(t) - y_o(t-1))^2 + (x_i(t) - x_o(t-1))^2}}, \quad 0 \leq \lambda \leq 1 \quad (1)$$

where k is an adaptive smoothing constant, $y_i(t)$ is an uncorrected y coordinate of the object at the second time, $y_o(t-1)$ is a corrected y coordinate of the object at the first time, $x_i(t)$ is an uncorrected x coordinate of the object at the second time, and $x_o(t-1)$ is a corrected x coordinate of the object at the first time.

According to the adaptive smoothing parameter $\lambda$, the coordinate correction device 216 corrects the image positions of the object in the first image and the second image to obtain a first weighted image position ($\lambda x_o(t-1)$, $\lambda y_o(t-1)$), and corrects the image positions of the second third image and the fourth image to obtain a second weighted image position (($1-\lambda)x_i(t)$, $(1-\lambda)y_i(t)$). Then, the coordinate correction device 216 calculates the output coordinate ($x_o(t)$, $y_o(t)$) at the second time according to the first weighted image ($\lambda x_o(t-1)$, $\lambda y_o(t-1)$) position, the second weighted image position (($1-\lambda)x_i(t)$, $(1-\lambda) y_i(t)$), and equations (2):

$$y_o(t) = (1-\lambda)y_i(t) + \lambda y_o(t-1)$$

$$x_o(t) = (1-\lambda)x_i(t) + \lambda x_o(t-1) \quad (2)$$

where $y_o(t)$ is a corrected y coordinate of the object at the second time, and $x_o(t)$ is a corrected x coordinate of the object at the second time. A concept of using the adaptive smoothing parameter $\lambda$ to correct image positions of the object to obtain the weighted image position is based on correlation between position of the object and image position at the last time being low/high if the object moves fast/slow. Therefore, a relationship between the adaptive smoothing parameter $\lambda$ and a velocity of the object is reverse according to the equation (1) and the abovementioned concept. A weighted value for the image position of the first time is $\lambda$ and a weighted value for the image position of the second time is $1-\lambda$.

Figure 3:
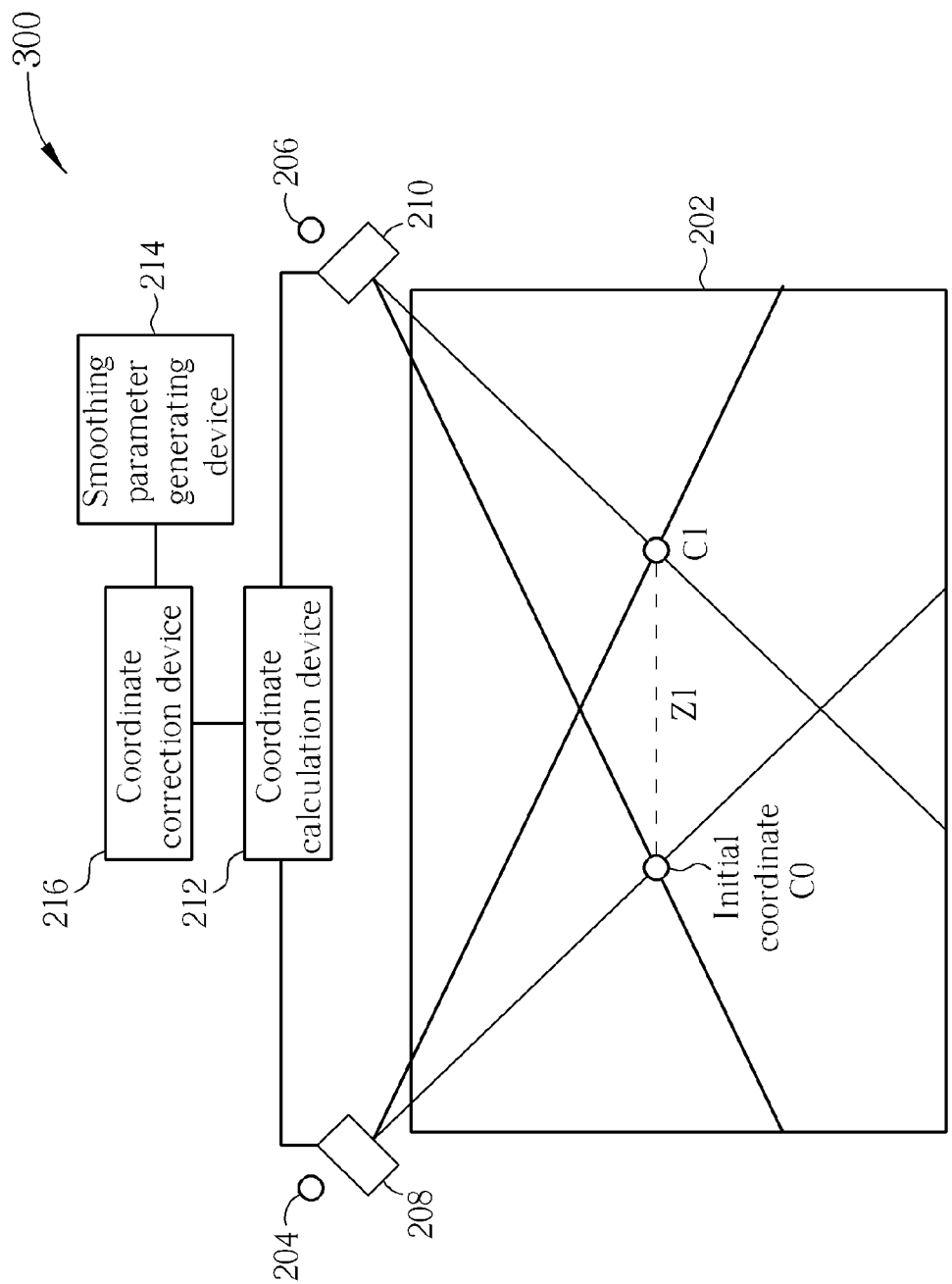
FIG. 3 is a diagram illustrating a displacement detection system of an optical touch panel according to another embodiment of the present invention.

Please refer to FIG. 3. FIG. 3 is a diagram illustrating a displacement detection system 300 of an optical touch panel according to another embodiment of the present invention. The displacement detection system 300 uses the coordinate calculation device 212 to save initial coordinate C0 of the object on the panel 202 at an initial time. The coordinate calculation device 212 uses the first image sensor 208 and the second image sensor 210 to capture a first image and a second image including images of the object respectively at a first time, and uses image positions of the object in the first image and the second image to calculate first coordinate C1 of the object at the first time. The coordinate correction device 212 calculates a displacement Z1 of the object between the initial time and the first time according to the initial coordinate C0 and the first coordinate C1. After obtaining the displacement Z1, subsequent operation steps of the displacement detection system 300 are the same as for the displacement detection system 200, so further description thereof is omitted for simplicity. It should be noted that, the initial coordinate C0 is an uncorrected coordinate but D1 in FIG. 2 is a corrected coordinate.

Step 414: The coordinate correction device 216 corrects an output coordinate of the object at the second time according adaptive smoothing parameter $\lambda$.

Please refer to FIG. 3. FIG. 3 is a diagram illustrating a displacement detection system 300 of an optical touch panel according to another embodiment of the present invention. The displacement detection system 300 uses the coordinate calculation device 212 to save initial coordinate C0 of the object on the panel 202 at an initial time. The coordinate calculation device 212 uses the first image sensor 208 and the second image sensor 210 to capture a first image and a second image including images of the object respectively at a first time, and uses image positions of the object in the first image and the second image to calculate first coordinate C1 of the object at the first time. The coordinate correction device 212 calculates a displacement Z1 of the object between the initial time and the first time according to the initial coordinate C0 and the first coordinate C1. After obtaining the displacement Z1, subsequent operation steps of the displacement detection system 300 are the same as for the displacement detection system 200, so further description thereof is omitted for simplicity.

Figure 4:
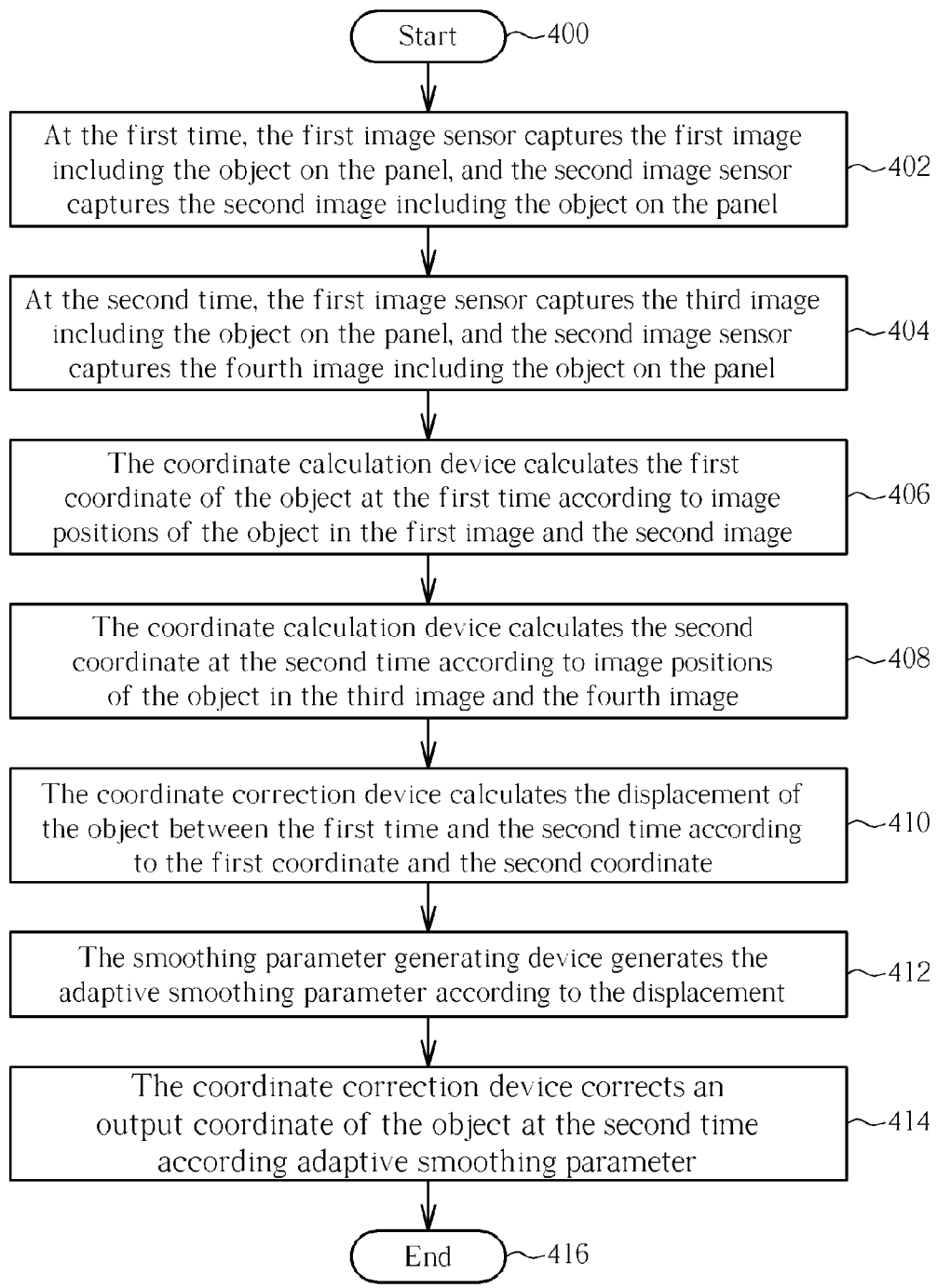
FIG. 4 is a flowchart illustrating a displacement detection method of an optical touch panel according to another embodiment of the present invention.

Please refer to FIG. 4. FIG. 4 is a flowchart illustrating a displacement detection method of an optical touch panel according to another embodiment of the present invention. FIG. 4 uses the displacement detection system 200 in FIG. 2 to illustrate the method.

Detailed Steps are as Follows:

Step 400: Start.

Step 402: At the first time, the first image sensor 208 captures the first image including the object on the panel 202, and the second image sensor 210 captures the second image including the object on the panel 202.

Step 404: At the second time, the first image sensor 208 captures the third image including the object on the panel 202, and the second image sensor 210 captures the fourth image including the object on the panel 202.

Step 406: The coordinate calculation device 212 calculates the first coordinate D1 of the object at the first time according to image positions of the object in the first image and the second image.

Step 408: The coordinate calculation device 212 calculates the second coordinate D2 at the second time according to image positions of the object in the third image and the fourth image.

Step 410: The coordinate correction device 216 calculates the displacement Z of the object between the first time and the second time according to the first coordinate D1 and the second coordinate D2.

Step 412: The smoothing parameter generating device 214 generates the adaptive smoothing parameter λ according to the displacement Z.

Step 414: The coordinate correction device 216 corrects the image positions of the object in the third image and the fourth image according to the adaptive smoothing parameter λ.

Step 416: End.

To sum up, the displacement detection system of an optical touch panel and method thereof provided by the present invention generate the adaptive smoothing parameter according to the displacement between two different time points. Then, based on the correlation between the position of the object and the image position at the last time being low/high if the object moves fast/slow, the present invention utilizes the adaptive smoothing parameter to give different weighted values to the image positions of the two different time points. Therefore, a moving trace of the object corrected by the weighted values may not be influenced when the object moves from the light/dark area to the light/dark area of the panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A displacement detection system of an optical touch panel, comprising:
a panel for being touched by an object;
at least one first image sensor and a second image sensor, wherein the first image sensor and the second image sensor are installed on different positions of the panel, and view of the first image sensor and view of the second image sensor are overlapped;
a coordinate calculation device for utilizing the first image sensor and the second image sensor to capture a first image and a second image including images of the object respectively at a first time, utilizing image positions of the object in the first image and the second image to calculate a first coordinate of the object at the first time, utilizing the first image sensor and the second image sensor to capture a third image and a fourth image including images of the object respectively at a second time, and using image positions of the object in the third image and the fourth image to calculate a second coordinate of the object at the second time; and
a coordinate correction device for calculating a displacement of the object between the first time and the second time according to the first coordinate and the second coordinate, and for correcting an output coordinate of the object at the second time according to the displacement.

2. The displacement detection system of claim 1, further comprising a light source for lighting the panel.

3. The displacement detection system of claim 1, wherein the coordinate correction device corrects the image positions of the object in the first image and the second image according to the displacement to obtain a first weighted image position, corrects the image positions of the object in the third image and the fourth image according to the displacement to obtain a second weighted image position, and calculates the output coordinate according to the first weighted image position and the second weighted image position.

4. The displacement detection system of claim 1, further comprising a smoothing parameter generating device for generating an adaptive smoothing parameter according to the displacement and the following equation:

$$\lambda = k \frac{1}{\sqrt{(y_i(t) - y_o(t-1))^2 + (x_i(t) - x_o(t-1))^2}}, \quad 0 \leq \lambda \leq 1;$$

wherein
λ is the adaptive smoothing parameter;
k is an adaptive smoothing constant;
$y_i(t)$ is an uncorrected y coordinate of the object at the second time;
$y_o(t-1)$ is a corrected y coordinate of the object at the first time;
$x_i(t)$ is an uncorrected x coordinate of the object at the second time; and
$x_o(t-1)$ is a corrected x coordinate of the object at the first time;
wherein the coordinate correction device corrects the output coordinate at the second time according to the adaptive smoothing parameter.

5. The displacement detection system of claim 4, wherein the operation that the coordinate correction device corrects the output coordinate at the second time according to the adaptive smoothing parameter is according to the following equations:

$$y_o(t) = (1-\lambda)y_i(t) + \lambda y_o(t-1);$$

$$x_o(t) = (1-\lambda)x_i(t) + \lambda x_o(t-1);$$

wherein
$y_o(t)$ is a corrected y coordinate of the object at the second time; and
$x_o(t)$ is a corrected x coordinate of the object at the second time.

6. A displacement detection method of an optical touch panel, comprising:
capturing a first image including an object by a first image sensor and a second image including the object by a second image sensor on a panel at a first time;
capturing a third image including the object by the first image sensor and a fourth image including the object by the second image sensor on the panel at a second time;

calculating a first coordinate of the object at the first time according to image positions of the object in the first image and the second image;

calculating a second coordinate of the object at the second time according to image positions of the object in the third image and the fourth image;

calculating a displacement of the object between the first time and the second time according to the first coordinate and the second coordinate; and correcting an output coordinate of the object at the second time according to the displacement.

7. The displacement detection method of claim 6, wherein correcting the output coordinate of the object at the second time according to the displacement comprises:

correcting the image positions of the object in the first image and the second image according to the displacement to obtain a first weighted image position;

correcting the image positions of the object in the third image and the fourth image according to the displacement to obtain a second weighted image position; and correcting the output coordinate according to the first weighted image position and the second weighted image position.

8. The displacement detection method of claim 6, further comprising generating an adaptive smoothing parameter according to the displacement and the following equation, and correcting the output coordinate at the second time according to the adaptive smoothing parameter:

$$\lambda = k \frac{1}{\sqrt{(y_i(t) - y_o(t-1))^2 + (x_i(t) - x_o(t-1))^2}}, \quad 0 \leq \lambda \leq 1;$$

wherein $\lambda$ is the adaptive smoothing parameter;

k is an adaptive smoothing constant;

$y_i(t)$ is an uncorrected y coordinate of the object at the second time;

$y_o(t-1)$ is a corrected y coordinate of the object at the first time;

$x_i(t)$ is an uncorrected x coordinate of the object at the second time; and $x_o(t-1)$ is a corrected x coordinate of the object at the first time.

9. The displacement detection method of claim 8, wherein correcting the output coordinate at the second time according to the adaptive smoothing parameter is performed according to the following equations:

$$y_o(t) = (1-\lambda)y_i(t) + \lambda y_o(t-1);$$

$$x_o(t) = (1-\lambda)x_i(t) + \lambda x_o(t-1);$$

wherein $y_o(t)$ is a corrected y coordinate of the object at the second time; and $x_o(t)$ is a corrected x coordinate of the object at the second time.

10. A displacement detection system of an optical touch panel, comprising:

a panel for being touched by an object;

at least one first image sensor and a second image sensor, wherein the first image sensor and the second image sensor are installed on different positions of the panel, and view of the first image sensor and view of the second image sensor are overlapped;

a coordinate calculation device for saving an initial coordinate of the object on the panel at an initial time, utilizing the first image sensor and the second image sensor to capture a first image and a second image including images of the object respectively at a first time, and utilizing image positions of the object in the first image and the second image to calculate a first coordinate of the object at the first time; and a coordinate correction device for calculating a displacement of the object between the initial time and the first time according to the initial coordinate and the first coordinate, and for correcting an output coordinate of the object at the first time according to the displacement.

11. The displacement detection system of claim 10, further comprising a smoothing parameter generating device for generating an adapting smoothing parameter according to the displacement and the following equation, and for correcting the output coordinate at the first time according to the adaptive smoothing parameter:

$$\lambda = k \frac{1}{\sqrt{(y_i(t) - y_o(t-1))^2 + (x_i(t) - x_o(t-1))^2}}, \quad 0 \leq \lambda \leq 1;$$

wherein $\lambda$ is the adaptive smoothing parameter;

k is an adaptive smoothing constant;

$y_i(t)$ is an uncorrected y coordinate of the object at the first time;

$y_o(t-1)$ is a y coordinate of the object at the first initial time;

$x_i(t)$ is an uncorrected x coordinate of the object at the first time; and $x_o(t-1)$ is a x coordinate of the object at the initial time.

12. The displacement detection system of claim 11, wherein the operation that the coordinate correction device corrects an output coordinate of the object at the first time according to the displacement is performed according to the following equations:

$$y_o(t) = (1-\lambda)y_i(t) + \lambda y_o(t-1);$$

$$x_o(t) = (1-\lambda)x_i(t) + \lambda x_o(t-1);$$

wherein $y_o(t)$ is a corrected y coordinate of the object at the end first time; and $x_o(t)$ is a corrected x coordinate of the object at the first time.

* * * * *